United States Patent [19]

Kamiya

[11] 4,440,412
[45] Apr. 3, 1984

[54] MOTORCYCLE

[75] Inventor: Tadashi Kamiya, Niiza, Japan

[73] Assignee: Honda Giken Kogyo Kabushiki Kaisha, Tokyo, Japan

[21] Appl. No.: 152,103

[22] Filed: May 21, 1980

[30] Foreign Application Priority Data

May 26, 1979 [JP] Japan ................................. 54-65237

[51] Int. Cl.³ .............................................. B62K 11/04
[52] U.S. Cl. ................................ 280/281 B; 180/231
[58] Field of Search ............... 180/219, 225, 226, 227, 180/228, 229, 231; 280/281 R, 283, 284, 289 S, 281 LP, 281 B, 785, 288; 296/15, 78.1

[56] References Cited

U.S. PATENT DOCUMENTS

| | | | |
|---|---|---|---|
| 1,547,157 | 6/1925 | Neracher | 180/231 |
| 4,139,072 | 2/1979 | Dawson | 280/281 R X |
| 4,237,996 | 12/1980 | Matsuda | 180/229 |

FOREIGN PATENT DOCUMENTS

| | | | |
|---|---|---|---|
| 822341 | 11/1951 | Fed. Rep. of Germany | 280/281 B |
| 784421 | 10/1957 | United Kingdom | 280/281 B |

*Primary Examiner*—Joseph F. Peters, Jr.
*Assistant Examiner*—Ross Weaver
*Attorney, Agent, or Firm*—Armstrong, Nikaido, Marmelstein & Kubovcik

[57] ABSTRACT

The application discloses a cowling structure of thin sheet material secured to the head pipe and provided to support a front-fork steering shaft and forms part of the vehicle frame with a rear-wheel driving power unit solidly fitted to the cowling structure to serve as a strength member of the vehicle frame. Such cowling and power unit assembly enables substantial reduction in weight as well as in air resistance.

1 Claim, 12 Drawing Figures

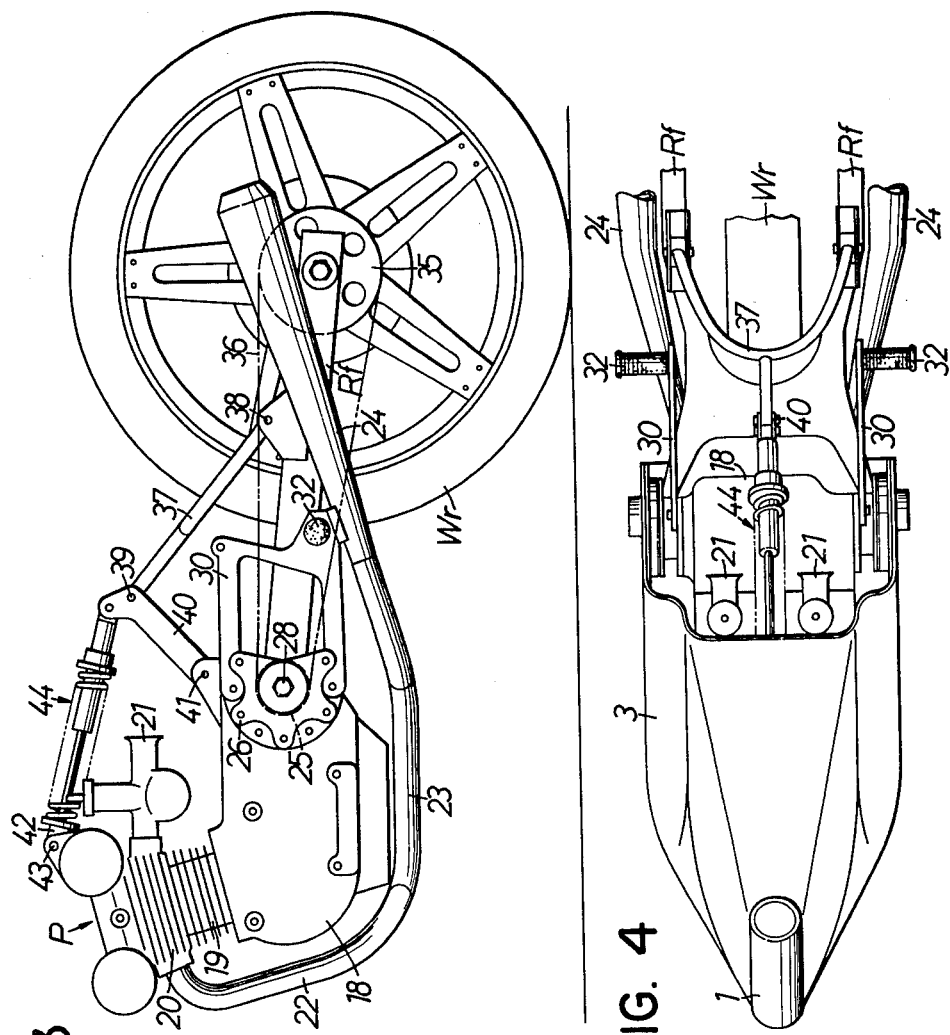
FIG. 3
FIG. 4
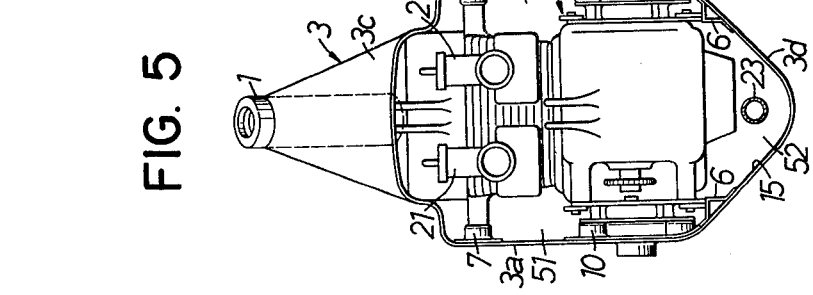
FIG. 5

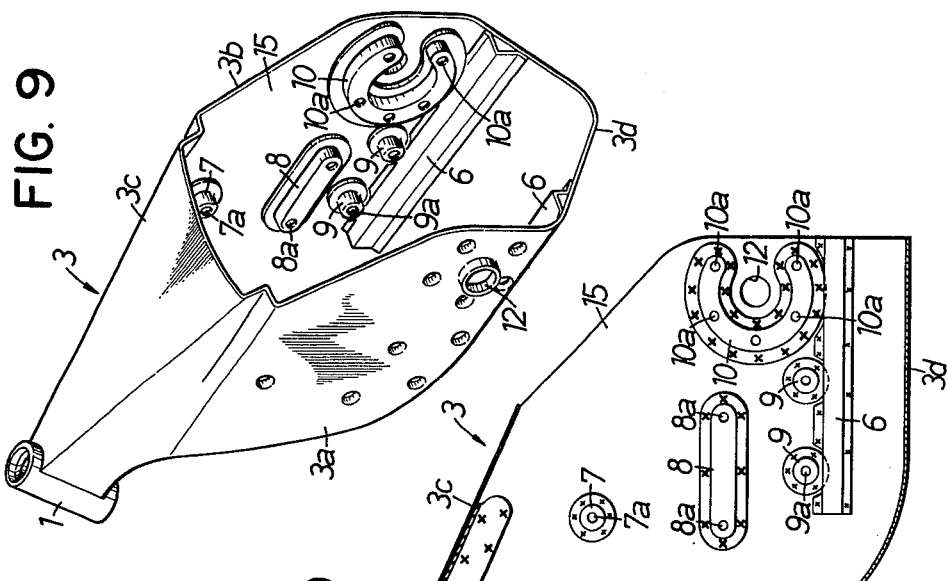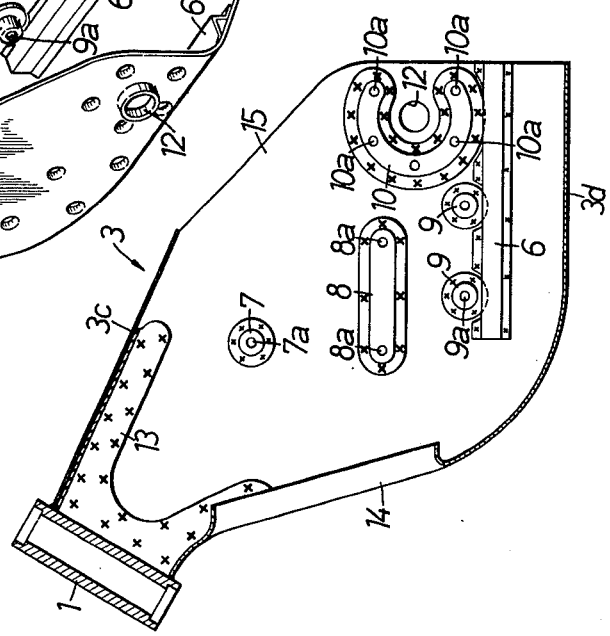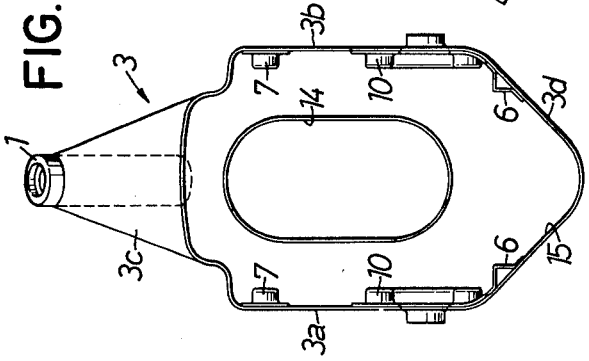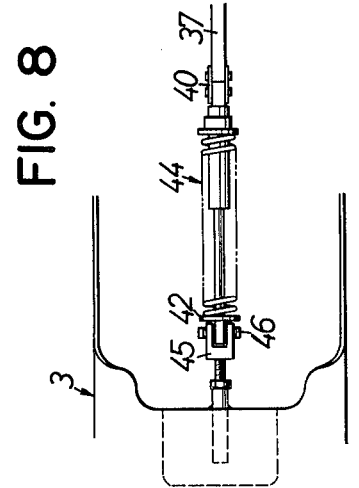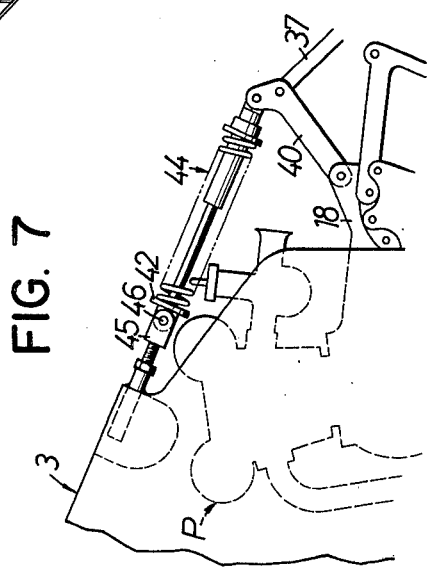

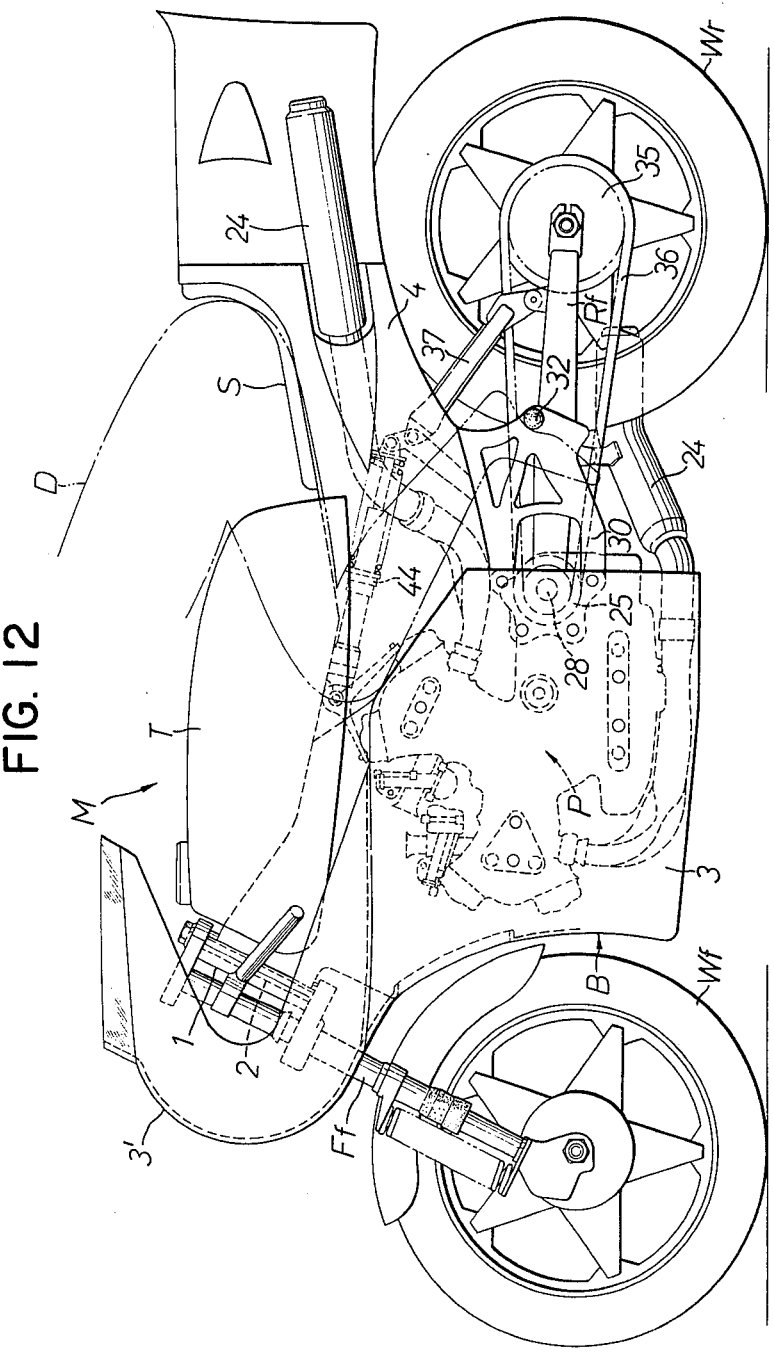

MOTORCYCLE

BACKGROUND OF THE INVENTION

This invention relates generally to motorcycles and more particularly to two-wheeled motorcycles of the type including a streamlined cowling structure arranged to cover the rear-wheel driving power unit.

In the past, with two-wheeled motorcyles of the type concerned, the cowling structure has only been used to cover the power unit to serve the purpose of reducing the air resistance of the vehicle during travel and has not been intended to serve as a strength member of the vehicle frame. Therefore, the use of such cowling structures has unavoidably resulted in an increase in vehicle weight.

On the other hand, with two-wheeled motorcycles, any slight difference in vehicle weight has a large influence on the different vehicle performances such as acceleration and maneuverability, and the use of a cowling structure involving increase in vehicle weight is undesirable.

SUMMARY OF THE INVENTION

In view of the above, the present invention has for its object the provision of a two-wheeled motorcycle of the type described which is so designed as not to cause any increase in vehicle weight even with use of the cowling structure. According to the present invention, there is provided a two-wheeled motorcycle which is characterized in that it comprises a streamlined cowling structure covering the rear-wheel driving power unit and adapted to form part of the vehicle frame with the power unit fitted to said cowling structure to serve as a strength member of the vehicle frame.

The above and other objects, features and advantages will become apparent with reference to the following description when considered in connection with the accompanying drawings, which illustrate the preferred emobodiments of the invention.

BRIEF DESCRIPTION OF THE DRAWINGS

In the drawings, which illustrate a preferred embodiment of the present invention:

FIG. 3 is a side elevation of the power unit and rear fork assembly including a fork-mounted rear wheel;

FIGS. 4 and 5 are views taken along the respective lines IV—IV and V—V in FIG. 2, looking in the direction of the arrows;

FIGS. 7 and 8 are side elevational and plan views respectively, illustrating a modification of the shock absorber mounting structure in relation to the cowling and power unit assemblies;

FIG. 9 is an oblique view of the cowling structure;

FIG. 10 is a side elevational view, in longitudinal cross section, of the cowling structure;

FIG. 11 is a rear view of same; and

FIG. 12 is a general side elevation of the two-wheeled motorcycle according to a second embodiment of the invention.

DESCRIPTION OF PREFERRED EMBODIMENTS

Figure 1:
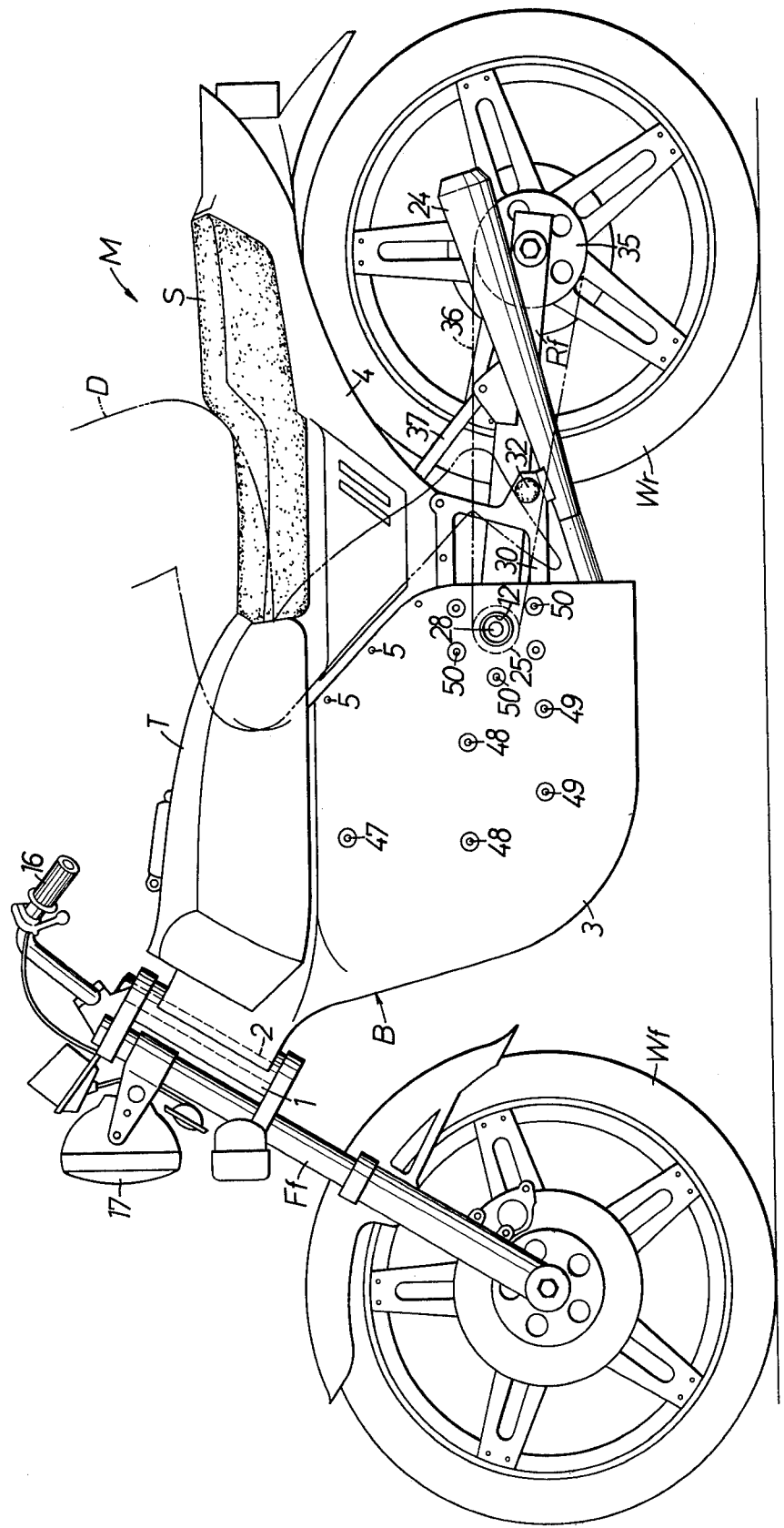
FIG. 1 is a general side elevation of the two-wheeled motorcycle showing a first embodiment of the invention.
Figure 2:
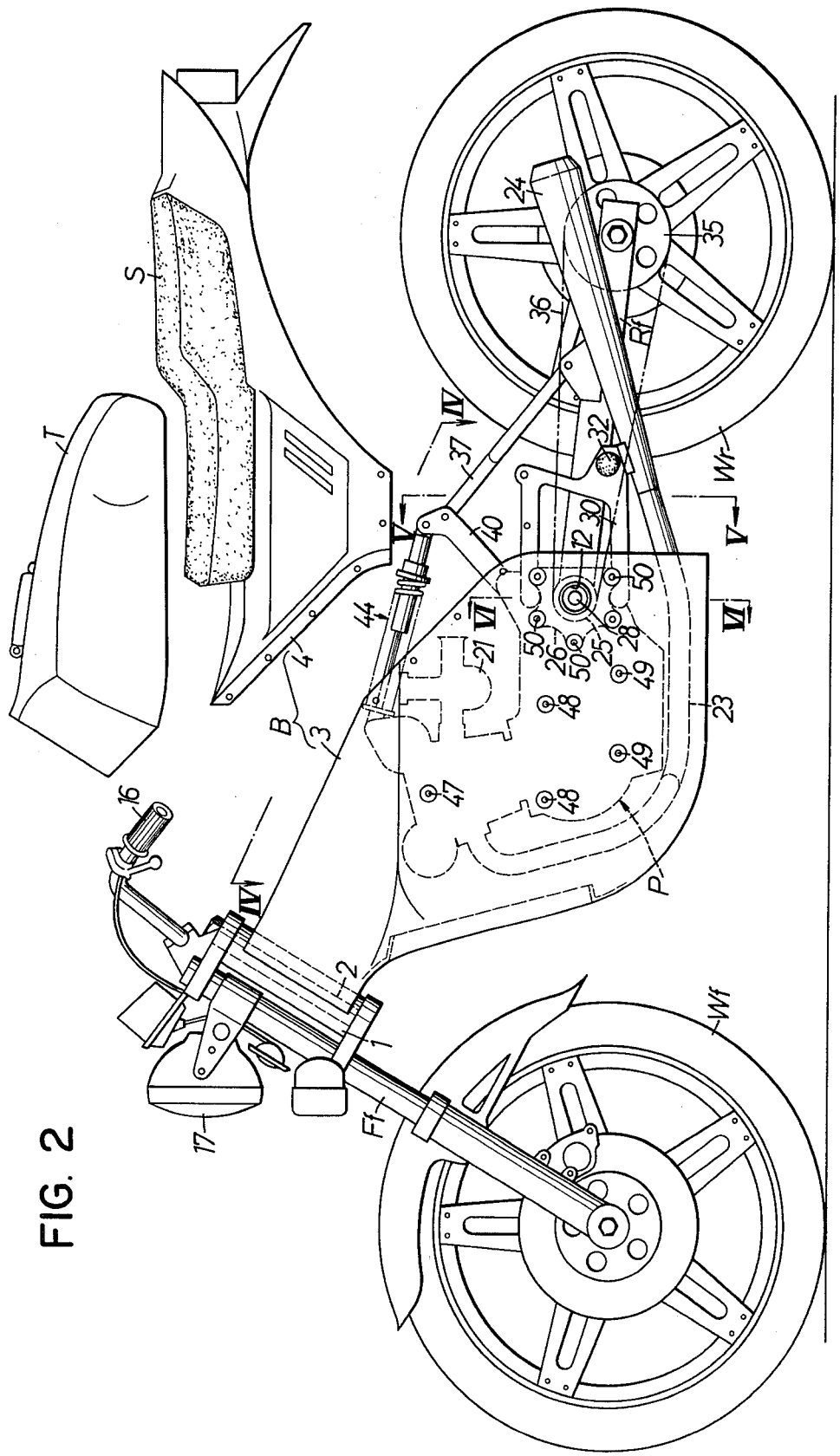
FIG. 2 is a view, similar to FIG. 1, in which the fuel tank and seat stay assembly are detached from the vehicle frame.

Referring to the drawings, and initially to FIGS. 1 and 2, the two-wheeled motorcycle M includes a vehicle frame B having a head pipe 1 diposed at the front end thereof, a front fork $F_f$ mounted on the head pipe 1 through the intermediate means of a steering shaft 2 to support a front wheel $W_f$, a rear-wheel driving power unit P accommodated in the vehicle frame B, and a rear fork $R_f$ pivotally connected to the power unit P to support a rear wheel $W_r$. Description will be made below of the arrangement and the construction of these vehicle components in order.

Firstly, the vehicle frame B comprises a cowling structure 3 of thin sheet material firmly secured at the front end to the head pipe 1 and extending rearwardly and downward therefrom, and a seat stay 4, of channel cross section, detachably connected to the rear end of the cowling structure 3 by screw means 5 and covering the top portion of rear wheel $W_r$. The cowling structure 3 includes a left and a right side section 3a and 3b, a roof section 3c interconnecting the side sections at their top, and a bottom section 3d interconnecting the side sections at their bottom. Further, the cowling structure is formed in its front and rear faces respectively with an air inlet opening 14, and an air outlet opening 15, and is as a whole streamlined in shape.

As is seen in FIGS. 9 and 10, a pair of guide rails 6 and a plurality of pairs of reinforcing and power unit supporting bosses 7 to 10, are fixed to the inside of left and right side sections 3a and 3b of cowling structure 3 as by welding in face-to-face relation to the adjacent sides of power unit P. As shown, the guide rails 6 extend horizontally in a front to rear direction and the bosses 10 in the rearmost pair are shaped in a circular arc, or in a C-chape, and are axially aligned with the output shaft 11 of the power unit P. The bosses 7 to 10 are formed therein with respective bolt holes 7a to 10a at an appropriate location or locations, as shown, and among others, the C-shaped bosses 10 are also formed each with a tool window or opening for insertion of tool 12 at its center.

The cowling structure 3 described above is formed integral or in appropriately divided form of a light-weight material such as light alloy or synthetic resin and has in itself no effective strength as required of a vehicle frame. Reference numeral 13 indicates a patch member bonded to the inside surface of the top portion of cowling structure 3 for local reinforcement thereof.

Provided on top of the cowling structure 3 is a fuel tank T in straddling relation thereto. Mounted on the seat stay 4, which extends rearwardly from the fuel tank, is a seat for the driver D to sit thereon in a straddling fashion.

The front fork $F_f$ is of telescopic construction with a steering handle 16 and a headlight 17 fitted, respectively, to the top end and to the front face thereof.

Description will next be made of the power unit P:

As is seen in FIG. 3, the power unit P includes a crankcase 18 and a multiple-barrel cylinder block 19 which extends upwardly from the front top of the crankcase and is inclined slightly forward. Connected to the top end of cylinder block 19 is a cylinder head 20 to the rear face of which a plurality of carburetors 21 are secured. Secured to the front face of cylinder head 20 are a plurality of exhaust pipes 22 which are bent to extend downwardly along the front face of the power unit P and jointed under the latter to a common exhaust duct 23. The exhaust duct 23, extending rearwardly along the bottom of the power unit P in the medial plane thereof, is connected with an exhaust muffler 24, which is arranged adjacent to the rear fork $R_f$.

Figure 6:
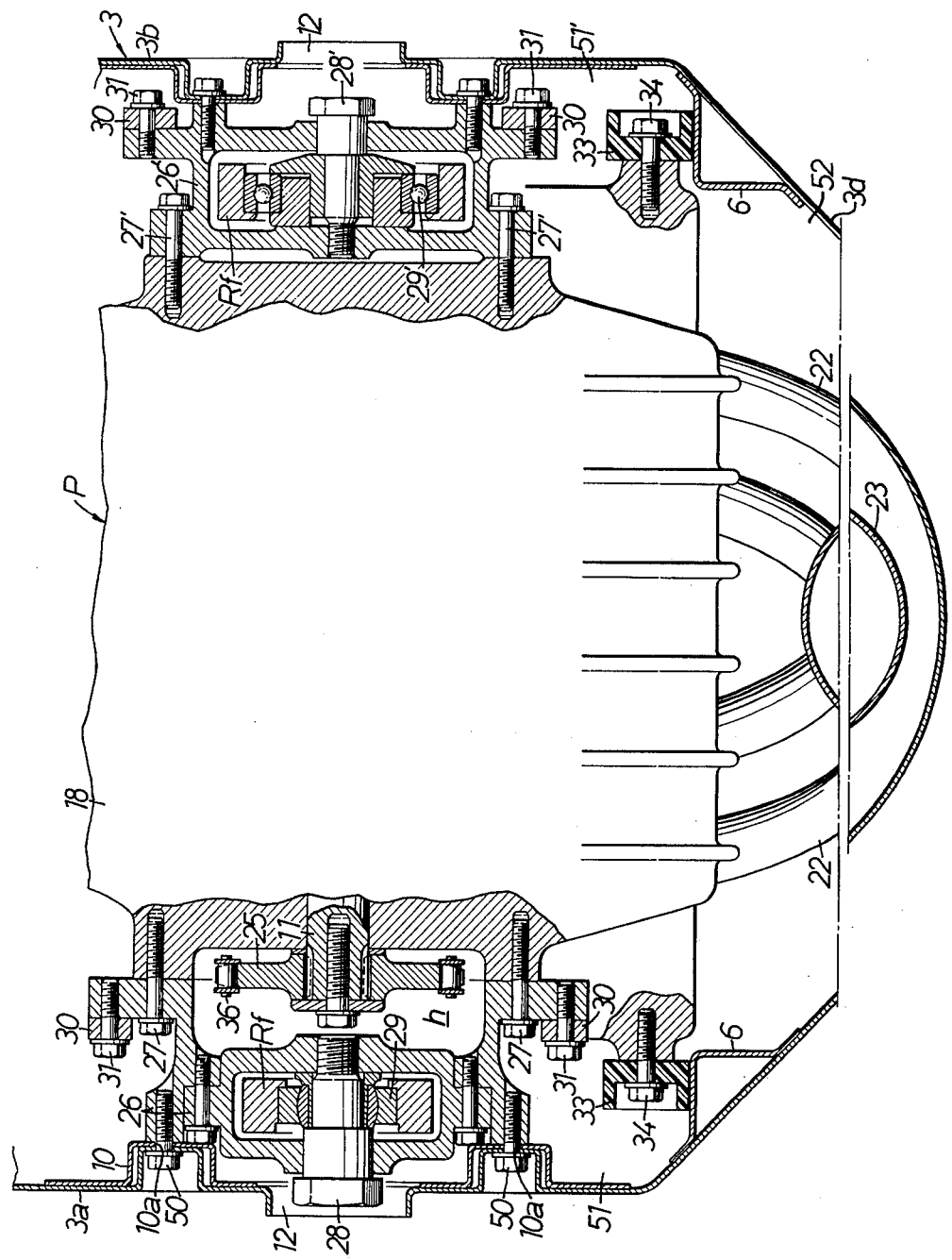
FIG. 6 is an enlarged cross section taken along the line VI—VI in FIG. 2.

As shown in FIG. 6, a driving sprocket wheel 25 is fixedly mounted on the output shaft 11 of power unit P, which extends exteriorly of the crankcase 18 through the left side wall thereof. An adapter 26 is fixed to the left side of the crankcase 18 by bolts 27, substantially covering the front half of the driving sprocket 25. Also, an adapter 26' is fixed to the right side of the crankcase 18 by bolts 27' in a position opposite to the adapter 26. A pair of pivot shafts 28 and 28', arranged axially in alignment with the output shaft 11, are removably threaded into the respective adapters 26 and 26'. The rear fork $R_f$ is pivotally mounted at its right and left front basal ends on the pivot shafts 28 and 28' through the intermediary of respective bearings 29 and 29'.

Further, a pair of parallel brackets 30 are firmly secured to the respective adapters 26 and 26' by bolts 31 and, extending rearwardly therefrom, each serve not only to support a bar-like step member 32 but also the adjacent leg of exhaust muffler 24.

Provided on the right and left sides of the crankcase 18 are a pair of slide members of synthetic resin material 33 which are secured to the crankcase by bolts 34 and slidable over the respective guide rails 6 on the inside of the cowling structure 3.

The rear wheel $W_r$, rotatably supported on the rear fork $R_f$ at the rear end thereof, has a driven sprocket wheel 35 secured coaxially thereto and a drive chain 36 is trained under tension between the driving and driven sprocket wheels 25 and 35, as shown. With this arrangement, the output of power unit P is transmitted from the output shaft 11 through the driving sprocket 25 and chain 36 to the driven sprocket 35 to drive the rear wheel $W_r$.

In order to prevent any unusual strain occurring in the area of pivotal connection of rear fork $R_f$ even with some deformation of the left leg of rear fork $R_f$ under the tension of drive chain 36, the bearing 29 on the pivot shaft 28, which lies adjacent to the output shaft 11 of power unit P, takes the form of a spherical bearing, as illustrated, so that a smooth up and down rocking movement of the rear fork $R_f$ is ensured.

Further, since the output shaft 11 and pivot shafts 28 and 28' are arranged in axial alignment with each other, as described above, the distance between the driving and driven sprockets 25 and 35 and, hence, the tension of the drive chain 36 remain unchanged at all times irrespective of the vertical position of the rear fork $R_f$ in its rocking movement.

As shown in FIGS. 3 and 4, a compression link 37 is pivotally supported 38 at its basal, rear end by the rear fork $R_f$ in straddling relation to the rear wheel $W_r$ for free vertical rocking movement. The link 37 is pivotally connected at its distal end with the distal end of a rocker link 40 as indicated at 39. The rocker link 40 is pivotally supported at its basal end on the top of crankcase 18 for fore and aft rocking movement. Arranged between the rocker link 40 and a mounting member 42, which is pivoted to the cylinder head 20 as at 43 for vertical rocking movement, is a shock absorber 44 fitted with a suspension spring, as shown. It will be noted that the suspension spring and shock absorber assembly 44 so arranged serves as an effective means for cushioning the rear fork $R_f$ in its vertical rocking movement during vehicle travel.

In the manner described above, the vehicle components, including the power unit P, rear wheel $W_r$, and the system of power transmission therebetween, are put together into a single assembly to be detachably fitted to the vehicle frame B and, more particularly, to the cowling structure 3; this enables the two-wheeled motorcycle to be assembled with particular ease and efficiency.

FIGS. 7 and 8 illustrate a modification of the mounting member 42 for shock absorber 44, which takes the form of an adjustable support rod 45 threaded into the top of the shell structure 3 and formed with a bifurcated head for pivotal connection 46 with the shock absorber.

To fit the assembly of FIGS. 3 to 5 to the vehicle frame B, the power unit P is inserted into the shell structure 3 through the air outlet opening 15 formed in its rear-end face by placing the slide members 33 in sliding engagement with the respective guide rails 6 until it is set in a predetermined position in the cowling structure. Subsequently, the bosses 7 to 10 on the opposite side sections 3a and 3b of the cowling structure 3 are firmly fixed to the power unit P by means of fastening bolts 47 to 50, which are inserted into respective bolt holes 7a to 10a from outside of the cowling structure 3. Among others, the C-shaped bosses 10 are clamped against the respective adapters 26 and 26' on the opposite sides of the power unit P with the result that the side sections 3a and 3b of the cowling structure 3 are firmly secured to the power unit P, particularly around the pivot shafts 28 and 28', on which the rear fork $R_f$ is mounted. In this manner, the power unit P serves solidly to interconnect the opposite side sections 3a and 3b, thus acting as a reinforcing or stiffening member effective to impart the substantial operational strength required of the vehicle frame to the cowling structure 3.

Further, in the power unit and cowling assembly, there are formed air passages 51, 51' and 52 between the power unit P and the left side section 3a, right side section 3b and bottom section 3d of the cowling structure 3 respectively, which place the air inlet and outlet openings 14 and 15 in fluid communication with each other, the exhaust collecting duct 23 being positioned in the bottom air passage 52. During travel of the vehicle, it will be apparent that air flows into the cowling structure 3 through the air inlet opening 14 formed at the front end thereof and, passing through the air passages 51, 51' and 52, thus acting to cool the power unit P and the exhaust duct 23 in an efficient manner, the same finally flowing out of the cowling structure through the air outlet opening 15.

In the normal riding position of the driver D, in which his feet are laid on the steps 32 with the fuel tank T held between his knees, as seen in FIG. 1, his legs are both held concealed behind the cowling structure 3 and this, together with the streamline configuration of the latter, contributes much to reduction in air resistance of the vehicle during travel.

In the state of the power unit P fitted to the cowling structure 3, when it is desired to separate the rear fork $R_f$ from the power unit P for maintenance work such as renewal of the drive chain 36, the only requirement is that an appropriate tool be inserted through the right and left tool windows 12 into the cowling structure 3 to draw the pivot shafts 28 and 28' out of the respective bearings 29 and 29', thereby, to disconnect the rear fork $F_f$ at its basal ends from the adapters 26 and 26'; there is no need for removing the power unit P once fitted to the cowling structure 3 therefrom. This enables the maintenance operation to be performed with particular ease and efficiency.

FIG. 12 illustrates another preferred embodiment of the present invention as applied to a two-wheeled motorcycle for racing use. This embodiment is of substantially the same structure as the previous embodiment except that it includes a top cowling 3' joined with the right and left side sections of the lower cowling structure 3 covering the power unit P and formed to cover the top half of the front fork $F_f$ on the front side thereof. In this figure, those parts corresponding to the components of the embodiment previously described are identified with the same reference numerals. In this embodiment, it will be appreciated that the upper and lower cowlings 3' and 3 are strengthened by each other so as to realize a vehicle frame B of much improved performance.

To summarize, according to the present invention, at least a portion of the vehicle frame is formed as a streamlined cowling structure that covers the rear-wheel driving power unit. The power unit is coupled or solidly fitted to the cowling structure to serve as a strength member of the vehicle frame. In this manner, according to the present invention, the cowling structure is employed to form the vehicle frame and the power unit serves also as a strength member of the latter. As the result, the vehicle weight can be held at the same level as that of two-wheeled motorcycles having no cowling structure or be reduced below the level; this coupled with the reduction in air resistance of the vehicle due to the streamlined cowling structure enables realization of a two-wheeled motorcycle much improved in performance areas including acceleration, maneuverability and fuel consumption while being particularly suited for racing use.

Accordingly, while there have been shown and described the preferred embodiment of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. A two-wheeled motorcycle comprising a steamlined cowling structure forming a part of the vehicle frame and having a pair of side sections, a roof section interconnecting said side sections at their top, and a bottom section interconnecting said side sections at their bottom; a power unit accommodated in said cowling structure and connected at its opposite sides to said respective side sections of said cowling structure, said side sections having at their inside a plurality of pairs of reinforcing and power unit supporting bosses in face-to-face relation to the adjacent sides of said power unit, said cowling structure being formed at its rear end with an opening through which said power unit is inserted into and removed from said cowling structure.

* * * * *